Patented Feb. 12, 1952

2,584,992

UNITED STATES PATENT OFFICE 2,584,992

ACTIVATED ADDITION HALOGENATION

Harry B. Dykstra, Wilmington, Del., assignor to E. I. du Pont de Nemours & Company, Wilmington, Del., a corporation of Delaware No Drawing. Application June 24, 1947,
Serial No. 756,801

5 Claims. (Cl. 260—648)

1

This invention relates to an improved process for the addition halogenation of organic compounds and particularly to the addition of halogen to aromatic compounds.

In commercial practice it is customary to carry out the addition halogenation of aromatic compounds using light as an initiator or catalyst. Thus, the insecticide hexachlorocyclohexane is prepared by the addition of chlorine to benzene under the influence of ultraviolet light. Without light, such addition halogenations are impractically slow. However, the use of light has several disadvantages; for example, light-catalyzed reactions must be carried out in small batches to insure adequate radiation, or complicated equipment is needed to achieve the necessary radiation of all parts of the reaction mixture. A further difficulty in certain instances, e. g., in the chlorination of benzene, is that the product tends to separate out as a solid. This solid is opaque to actinic radiation and therefore reduces the effectiveness of the source of radiation. A third disadvantage in the case of ultraviolet light is the necessity for precautions to protect operating personnel from the light rays.

This invention has as an object the provision of an improved process for the addition halogenation of aromatic compounds. A further object is the provision of a process for the addition chlorination of benzene. Other objects will appear hereinafter.

These objects are accomplished by the following invention, wherein an aromatic compound capable of undergoing addition halogenation is halogenated by bringing said compound in contact with chlorine or bromine, i. e., with a halogen having an atomic number of $18n-1$ where $n$ is an integer from 1 to 2, i. e. 17 to 35, inclusive, in the presence of 0.01 to 5%, based on the weight of aromatic compound, of an azo compound in which the azo nitrogens are attached to different carbon atoms and in which at least one of the azo nitrogen atoms is attached to a tertiary aliphatic or cycloaliphatic carbon atom, which carbon is in turn joined to a negative monovalent radical, through a carbon of said radical, which latter carbon has its three remaining valences satisfied by oxygen or nitrogen, i. e., elements of atomic numbers 7 and 8. The negative monovalent radicals referred to are cyano, carbonamide, and carbalkoxy groups, all of which are hydrolyzable to carboxyl groups.

A suitable method for effecting addition halogenations according to the process of this invention is by introducing chlorine or bromine into a heated mixture of the aromatic compound, and an azo initiator of the type mentioned above. In the case of benzene the products are hexachlorocyclohexane and hexabromocyclohexane, respectively. The time required to obtain the desired degree of halogenation will depend upon several factors, including the concentration of the reactants, the specific azo initiator, the temperatures employed, the degree of agitation, and the specific reactants. The halogen can be used in excess over that required to give the addition product. In most instances a satisfactory yield of addition product is obtained in 0.1 to 10 hours.

In the examples below, which are illustrative and not limitative, the first two show the use of elevated temperatures in the absence of light, while the third example demonstrates that the reaction may be carried out at low temperatures when light of wave lengths that are transmitted by ordinary glass vessels is employed in conjunction with the azo initiator. In the examples the parts are given by weight.

Example I

Chlorine was passed continuously into 200 parts of thiophene-free benzene containing one part of alpha,alpha'-azodiisobutyronitrile [which has the formula $(CH_3)_2C(CN)N=NC(CN)(CH_3)_2$] in a container opaque to light. After a reaction period of about two hours, during which time the temperature was maintained between 65 and 75° C., the increase in weight of the contents of the reaction vessel was 46.7 parts. The reaction mixture was then subjected to steam distillation. By this technique 175 parts of benzene was recovered from the distillate and 60.1 parts of hexachlorocyclohexane in the form of a white, waxy, crystalline solid remained as the residue. This represents a 77.7% yield of hexachlorocyclohexane, based on the benzene consumed. The product melted slowly between 85 and 147.5° C. By biological assay (Peet-Grady test of insecticidal action and comparison to standards) it contained 10-15% of the gamma-isomer of hexachlorocyclohexane.

Example II

Chlorine was passed for 5.5 hours into a reactor opaque to light containing a solution of one part of alpha,alpha' - azobis(alpha - cyclopropylpropionitrile) dissolved in 200 parts of thiophene-free benzene heated to 60° C. Towards the end of the reaction period large amounts of white, crystalline material separated out. On working up the reaction mixture as in Example I, 139.2 parts of chlorinated benzene was isolated. Biological assay (Peet-Grady test) of the total chlorinated product indicated that the material contained 10-15% of the gamma-isomer of hexachlorocyclohexane.

In a control run chlorine was passed into 200 parts of thiophene-free benzene, containing no azo compound, heated to 60° C. in a reactor opaque to light. Since no apparent reaction occurred, the temperature was raised during the course of two hours to the reflux temperature (81° C.). Even at this temperature absorption of chlorine was slow. After 2.5 hours' additional treatment with chlorine at this temperature, the reaction mixture, which contained some unreacted chlorine, was allowed to stand at room temperature for two days. On working up the reaction mixture as in Example I, 21.7 parts of chlorinated benzene was isolated.

*Example III*

In a glass container equipped with a stirrer, thermometer, condenser cooled with solid carbon dioxide, and gas inlet tube was placed 22 parts of benzene. Gaseous methyl chloride was passed in until 100 parts had condensed and formed a solution with benzene. A total of 0.5 part of alpha,-alpha' - azobis(alpha,gamma - dimethylvaleronitrile) was added and the container irradiated with light of 3100–4500 Å wave lengths while chlorine was passed into the stirred mixture. Chlorine absorption began at once. The temperature of the mixture remained at −15° C. for 1.5 hours, at the end of which time addition of chlorine was stopped and the mixture was warmed to room temperature. A solid, white powder which had been begun to separate as soon as the chlorine addition began was removed by filtration and the filtrate concentrated in a vacuum until a viscous, non-volatile liquid remained which slowly crystallized to a pale yellow solid. The total solid products, that is, that separated by filtration plus that obtained from concentration of the filtrate, amounted to 77.3 parts which, on the basis of conversion of benzene to hexachlorocyclohexane, corresponded to a 94% yield. Biological assay of the composite solid product indicated that 13% of the gamma-isomer of hexachlorocyclohexane was obtained, although the percentage of gamma-isomer in that portion of the product obtained from the filtrate was 30%.

In the process of this invention there is employed as the initiator for addition chlorination or addition bromination of the aromatic compound an azo compound in which both valences of the azo group (—N=N—) are attached to different carbons, at least one (and preferably both) of which are tertiary carbon atoms, aliphatic in character, i. e. aliphatic or cycloaliphatic, which carbon is further attached to a monovalent negative radical through a carbon of said radical, which latter carbon has its three remaining valences satisfied by oxygen and/or nitrogen, i. e. atoms of atomic numbers 7 and 8. The preferred initiators are the symmetrical azo compounds having two tertiary aliphatic carbons attached to nitrogen, in view of their increased activity at lower temperatures. In the case of azo compounds containing a carbalkoxy group the alkyl radical in the carbalkoxy group is preferably one containing from 1 to 6 carbons. Examples of useful azo initiators are alpha,alpha'-azobis(alpha,gamma-dimethylvaleronitrile); dimethyl alpha,alpha'-azodiisobutyrate; diethyl alpha,- alpha'-azodiisobutyrate; dihexyl alpha,alpha'-azodiisobutyrate; 1,1'-azodicyclohexanecarbonitrile, alpha,alpha' - azodiisobutyrocarbonamide; alpha,alpha' - azobis(alpha,gamma - dimethylvalerocarbonamide); alpha,alpha'-azobis(alpha-cyclopropylpropionitrile); alpha,alpha' - azobis-(alpha-phenylpropionitrile); alpha - (carbamylazo) isobutyronitrile; alpha-(carbamylazo)-alpha - cyclopropylpropionitrile; dimethyl alpha,-alpha'- azobis(alpha,gamma - dimethylvalerate); alpha,alpha'- azobis(alpha-methyl-gamma - carboxylbutyronitrile); and alpha,alpha' - azobis-(alpha - methyl - gamma - carboxybutyronitrile).

The more useful azo compounds have radicals of 4 to 9 carbons attached to each azo nitrogen. The azo compounds employed in this reaction are suitably present in amounts of from 0.01 to 5%, based on the weight of the aromatic compound. Higher amounts can be used but for most halogenations amounts of from 0.1 to 2% give preferred rates of reaction.

The azo initiators may be employed in the chlorination or bromination of any aromatic compound subject to addition halogenation, but their use is especially advantageous in the case of halogenations which normally require the activating influence of light, since the azo initiator obviates the need for light. As indicated in Example III, however, it is not necessary to exclude light; in fact, the azo compound and light may function simultaneously in accelerating addition halogenation. Other halogenation initiators, and particularly organic peroxides, e. g., benzoyl peroxide and diethyl peroxide, can be used in conjunction with the azo initiator.

Numerous aromatic compounds which are susceptible to addition chlorinations and addition brominations are known and can be used in this invention. This includes also compounds which undergo both addition and substitution halogenation. Particularly suitable are aromatic compounds of 6 to 14 ring or nuclear carbons, e. g., liquid hydrocarbons such as benzene, orthoxylene, and styrene, and solid hydrocarbons such as naphthalene, anthracene, and phenanthrene. Examples of aromatic compounds other than hydrocarbons which undergo addition halogen and which can be chlorinated or brominated in accordance with the process of this invention are chlorobenzene, fluorobenzene and benzonitrile. Thus chlorination of monochlorobenzene yields heptachlorocyclohexane. In the case of products that are solid at the desired halogenation temperature, a solvent, e. g. carbon tetrachloride or methyl chloride, is used to liquefy the reaction mixture.

The process of this invention is carried out in equipment constructed of glass, enamel-lined steel, or other material which is not corroded by halogen. The temperature at which halogenation takes place varies with the compounds used and the conditions. When light is used in conjunction with the azo initiator, it is possible in some instances to operate as low as −50° C. or lower. When no light is used, it is generally desirable to operate between 50-100° C., although temperatures as high as 200° C. may be used. When light is used, the wave length is preferably between 3000 and 4500 Angstrom units.

The process of this invention is useful in making valuable chlorinated and brominated products. It is particularly well adapted to the preparation of hexachlorocyclohexane for use as an insecticide.

The foregoing detailed description has been given for clearness of understanding only and no unnecessary limitations are to be understood therefrom. The invention is not limited to the exact details shown and described, for obvious modifications will occur to those skilled in the art.

What is claimed is:

1. In the addition halogenation of an aromatic compound which is subject to addition halogenation, the improvement wherein said compound, in the liquid state and at a temperature not higher than 200° C., is brought in contact with a halogen of atomic number $18n-1$ where $n$ is an integer from 1 to 2 in the presence of from 0.01 to 5%, based on the weight of the aromatic compound, of an azo compound having both valences of the azo, —N=N—, group attached to different tertiary carbons, aliphatic in character, which carbons are each in turn attached to cyano groups.

2. In the addition chlorination of an aromatic compound subject to addition chlorination, the improvement wherein the chlorine is brought into contact with the aromatic compound, in the liquid state and at a temperature not higher than 200° C., in the presence of an azobiscyanoalkane wherein each cyanoalkyl group is of 4-9 carbons and is bonded to the azo nitrogen from tertiary carbon.

3. In the addition halogenation of benzene to benzene hexahalide, the improvement wherein the benzene is brought into contact, in the liquid state and at a temperature not higher than 100° C., with halogen of atomic number $18n-1$ where $n$ is an integer from 1 to 2 in the presence of an azo compound having both valences of the azo, —N=N—, group attached to different tertiary carbons, aliphatic in character, which carbons are each in turn attached to cyano groups.

4. In the addition chlorination of benzene to hexachlorocyclohexane, the improvement wherein the benzene, in the liquid state and at a temperature not higher than 100° C., is brought into contact with chlorine in the presence of alpha,-alpha'-azodiisobutyronitrile.

5. In the addition chlorination of benzene to benzene hexachloride the improvement wherein liquid benzene is brought into contact with chlorine at a temperature not higher than 100° C. in the presence of an azobis(cyanoalkane) wherein the cyano group is on tertiary carbon attached to the azo group.

HARRY B. DYKSTRA.

REFERENCES CITED

The following references are of record in the file of this patent:

UNITED STATES PATENTS

| Number | Name | Date |
| --- | --- | --- |
| 2,010,841 | Bender | Aug. 13, 1935 |
| 2,218,148 | Hardie | Oct. 15, 1940 |
| 2,299,441 | Vaughan et al. | Oct. 20, 1942 |
| 2,324,249 | Vaughan et al. | July 13, 1943 |

OTHER REFERENCES

Stewart et al.: Jour Am. Chem. Soc., vol. 53, pages 1121-8, (1931).

Kharasch et al.: Jour Org. Chem. vol. 6, pages 810-17, (1941).

Certificate of Correction

Patent No. 2,584,992                                February 12, 1952

HARRY B. DYKSTRA

It is hereby certified that error appears in the printed specification of the above numbered patent requiring correction as follows:

Column 3, line 37, after "had" strike out "been"; column 4, line 47, for "halogen" read *halogenation*;

and that the said Letters Patent should be read as corrected above, so that the same may conform to the record of the case in the Patent Office.

Signed and sealed this 29th day of April, A. D. 1952.

[SEAL]

THOMAS F. MURPHY,
*Assistant Commissioner of Patents.*